United States Patent [19]

Breum

[11] Patent Number: 4,589,643
[45] Date of Patent: May 20, 1986

[54] CONTAINER

[75] Inventor: Jens Breum, Korsør, Denmark

[73] Assignee: Kahler & Breum, Denmark

[21] Appl. No.: 606,694

[22] Filed: May 3, 1984

[30] Foreign Application Priority Data

May 10, 1983 [DK] Denmark ............................ 2079/83

[51] Int. Cl.⁴ ............................................. B65D 45/32
[52] U.S. Cl. .................................. 220/5 R; 220/5 A; 220/3; 220/320
[58] Field of Search .............. 220/5 R, 5 A, 4 B, 4 E, 220/3, 76, 80, 81 R, 320, 324, 325

[56] References Cited

U.S. PATENT DOCUMENTS

| 1,366,955 | 2/1921 | Schneible | 220/5 A |
| 3,910,447 | 10/1975 | Bevilacqua | 220/3 |
| 3,981,409 | 9/1976 | Flanders | 220/5 R |
| 4,267,940 | 5/1981 | Wade | 220/320 X |

FOREIGN PATENT DOCUMENTS

| 215364 | 6/1958 | Australia | 220/5 R |
| 1452908 | 12/1964 | Fed. Rep. of Germany . | |
| 2651853 | 11/1976 | Fed. Rep. of Germany . | |
| 2741309 | 9/1977 | Fed. Rep. of Germany . | |
| 924204 | 2/1946 | France . | |
| 1077954 | 11/1954 | France | 220/5 R |
| 1353920 | 4/1963 | France . | |

Primary Examiner—Steven M. Pollard
Attorney, Agent, or Firm—Fitch, Even, Tabin & Flannery

[57] ABSTRACT

A container especially for treatment and storage of corrosive liquids and gases comprises two cup-shaped end portions with opposing openings, and the circumferential rim portions of which are corbelled and tightened together with inserted sealing means about an annular intermediate portion by means of tightening means. Through bores are provided in the intermediate portion for the mounting of pipe connections to the container and for means located in the container such as for instance heat exchangers and stirrers and for fittings and supporting means for the container. The container must be deep-drawn and may comprise several layers of material, e.g. copper and stainless steel, which may be deep-drawn simultaneously on top of each other in the same pressing implement. In this manner a particularly inexpensive container resistant to corrosion is obtained, which furthermore is easy to mount and the individual parts of which are easy to replace.

1 Claim, 6 Drawing Figures

CONTAINER

FIELD OF THE INVENTION

The invention relates to a container especially for treatment or storage of liquid and for compressed air or the like media.

BACKGROUND ART

Traditionally such containers are produced by welding together the dished ends with welded mantles and optionally followed by a welding of flanges onto the free rim portions of the mantles and possibly onto other openings in the container. Subsequently, greater container parts are assembled by means of the flanges, and pipe connections, covers, and possible fittings are mounted onto the flanges or pipe stubs welded in the container wall and provided with threads on their free ends.

Such a procedure involves much work and requires much precision and control of whether the weldings have been correctly carried out, the reason why this procedure is both expensive and laborious. In addition, these weldings are always vulnerable to corrosions. In order to achieve a suitable protection against corrosive liquids and/or gases, containers with two or more layers are sometimes used, whereby the inner layer may be made of copper or stainless steel. However, the joints in the inner layer and at pipe stubs welded thereon imply that locations particularly vulnerable to corrosion nevertheless arise.

SUMMARY OF THE INVENTION

The object of the invention is accordingly to provide a construction for a small container for heating and storing preferably corrosive liquids and gases, where the container is inexpensive to produce, easy to mount, and whereby it is easy to replace its parts, and which furthermore is reliably resistant to corrosion.

The container according to the invention is characterized in that it comprises two cup-shaped end portions with opposing openings and the circumferential rim portions of which are corbelled, and an intermediate portion located between said end portions as well as one or more tightening means located about the intermediate portions and the corbelled rim portions and tightening said end portions and said intermediate portion together, and where through bores are provided in the intermediate portion for the mounting of inlet and outlet pipes for the container and for the mounting of means such as heat exchangers, stirrers or the like means located in the container and furthermore for the mounting of fittings and supporting means for the container. Such a container is inexpensive to produce since it requires very little labour for the production of the end portions which may be produced without connecting openings. Furthermore, the container is easy to mount and dismount since neither a welding nor particular implements are necessary. In addition, it is easy to provide the container with various means and fittings as well as supporting means, all said means being mountable in the through bores in the particular intermediate portion. These bores can in addition be provided with pipe threads and be spotfaced for use for the packing surface so that the individual portions of the container are easily replaceable.

In a simple and reliable manner the container may be sealed by means of sealing means between the end portions and the intermediate portion, said sealing means for instance being located in sealing grooves in the rim surfaces of the intermediate portion.

When the end portions according to the invention are double- or multilayered, it is possible to use a material particularly resistant to corrosion on the inside and a material providing strength on the outside.

A particularly inexpensive production of the end portions is achieved by said portions being produced by deepdrawing sheet material. Such a production of the end portions is particularly labour-saving, and the inner end portion resistant to corrosion appears thereby without joints such as weldings or solderings. In this manner the risk of corrosions is essentially reduced since only the intermediate ring is provided with weldings.

A particularly advantageous embodiment of the container according to the invention is characterized by the end portions being produced through simultaneously deep-drawing the layers of sheet material forming said portions on top of each other in the same implement. As a result, an extremely rational and inexpensive production of the end portions is obtained. In addition, a particularly good connection is established between the various material layers of the portion so that the inner material layer may be selected very thin without involving a risk of said layer bursting under normal use loads.

An additional reduction of the production price of the end portions may according to the invention be obtained by the corbels being drawn, pressed or beaded out of the walls of said end portions.

According to the invention a particularly reliable, inexpensive and easily mountable way of assembling the container may include the steps of the tightening means comprising two annular flanges of a substantially angle-iron cross section, the angle between the two webs, however, ranging from 90° to 120°, preferably from 100° to 110° and such that each flange comprises an inner cone ring and a planar outer ring coherent with the rim having the greatest diameter of said cone ring, whereby the clear of the cone ring corresponds to the outer diameter of the end portions of the container immediately adjacent the circumferential corbelled rim portions of said end portions, as well as a plurality of tightening means such as bolts adapted to tighten the two flanges together with the opposing cone rings in such a manner that the inner rims of the cone rings press against the corbelled rim portions of the end portions and sealingly position said portions against the intermediate portion, and whereby the line of attack of the tightening means, e.g. the bolt circle, substantially coincides with the intermediate plane through the pressure-receiving cone ring, and where extrusions are carried out in the flange about the bolt holes to form contact surfaces for the tightening means.

According to another tightening way particularly suited for small containers with high pressures, the tightening means may according to the invention comprise a tightening ring composed of several parts and with through bores of at least the same size and arranged with the same axis of symmetry as the bores of the intermediate portion, said parts fitting closely over the mounted container rim portions in the mounted state and squeezing said portions about the intermediate portion by means of tightening means such as tightening screws, tension bands or the like means.

According to the invention the intermediate portion may comprise at least two rings clamped together in extension of each other, each ring comprising through bores, whereby at least one dividing means extends between said rings so as to completely or partially divide the chambers on each side of said dividing means. Hereby it is obtained that the container extends its field of application, e.g. by using a semi-permeable membrane according to the invention as dividing means, which allows the container to be used for filtering purposes.

As the outer container layer of the container according to the invention may be made of a rigid material resistant to drawing, pressing and impacts such as for instance stainless steel, steel or fiber-reinforced plastics, and as the inner container layer may be made of a material resistant to predetermined corrosive substances and for instance be stainless steel, copper or plastics, a possibility of a combination of materials is obtained which meets almost all purposes.

According to the invention the portions may be surrounded by an insulating material, e.g. in the form of insulating cups tightened together about the container, whereby the insulation of the container may be carried out in a rational and inexpensive manner.

The corbelled rim portions of the end portions are provided with such a shape that they surround the intermediate ring on the outside at the same time as they have a centering effect for said ring. In addition, they serve as packing surfaces co-operating with the sealing means in the rim surfaces of the intermediate portion.

BRIEF DESCRIPTION OF DRAWING

The invention will be described below with reference to the accompanying drawing, in which.

DESCRIPTION OF PREFERRED EMBODIMENTS

Figure 1:
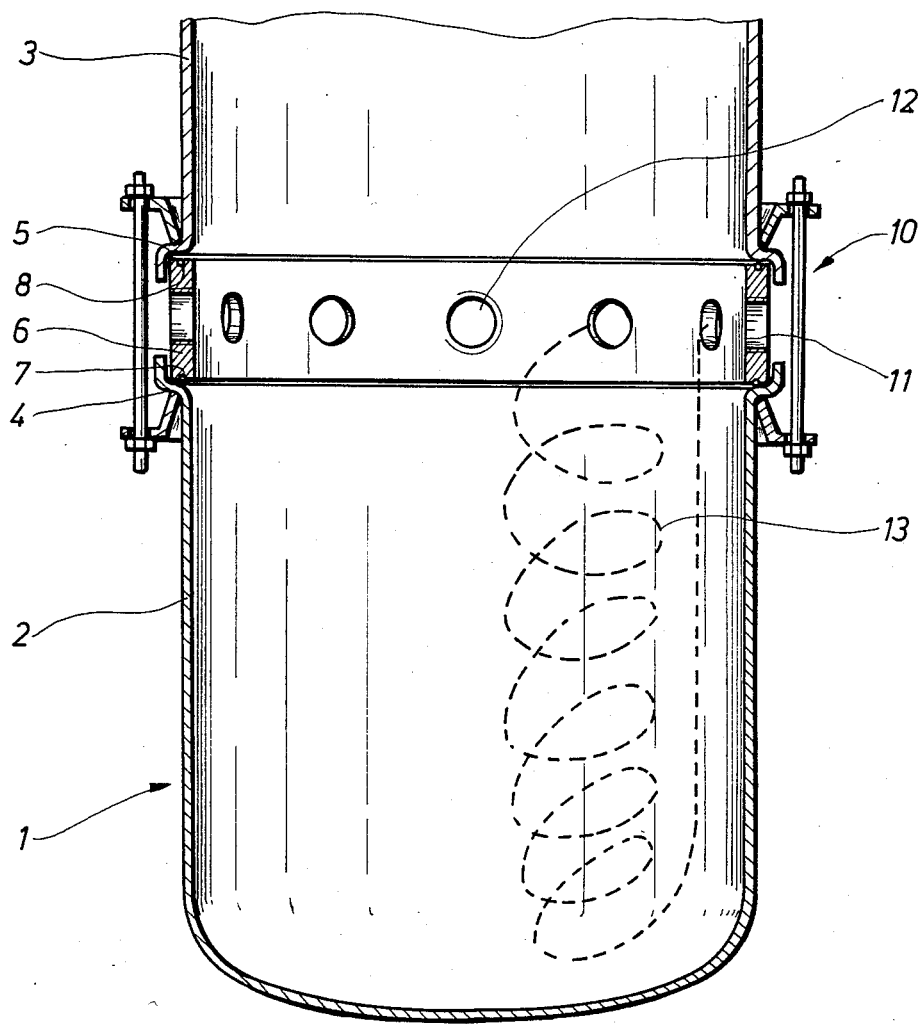
FIG. 1 is a side sectional view of a container according to the invention, whereby one dished end is cut off.

FIG. 1 illustrates a substantially cylindrical container 1 according to the invention, one dished end of which has been cut off. It comprises two cup-shaped end portions 2, 3 manufactured separately through deep-drawing, and the circumferential free rim portions 4, 5 which are corbelled, as well as an annular intermediate portion 6 with associated annular sealing means 7, 8. The two end portions 2, 3 of the container are tightened together about the intermediate portion 6 by means of a tightening means 10, which will be described in connection with FIG. 2. The end portions of the container are here illustrated with a single material layer, whereas the portions illustrated in FIGS. 2, 4, and 5 comprise two layers. The intermediate portion 6 is made of a relatively thick, e.g. 10 mm thick, plate welded together to a ring of substantially the same inner diameter as the inner diameter of the container. At suitable intervals along the circumference of the intermediate portion 6, threaded through bores 11, 12 are provided for the mounting of various pipe connections to the container. When the container is to be used for heating water, it is provided with a heating coil 13 or electric heaters connected and secured at the through bores of the intermediate portion. Inlet pipes and outlet pipes for the secondary water and thermometers, anodes etc. are also connected to the through bore 11, 12 of the intermediate portion. Holes not used are closed by means of plugs, and the finished container is suspended in wall fittings (not shown) carrying the weight of the container with contents by means of a projection mounted in one of the bores of the intermediate portion. When the container is vertically mounted on the wall fittings, the container is supported horizontally by a pair of legs resting on the lower end of the lower end portions.

When necessary the container is mounted with insulation made for instance of two shells of polyurethane foam in turn positioned about the container by means of tightening bands.

Figure 2:
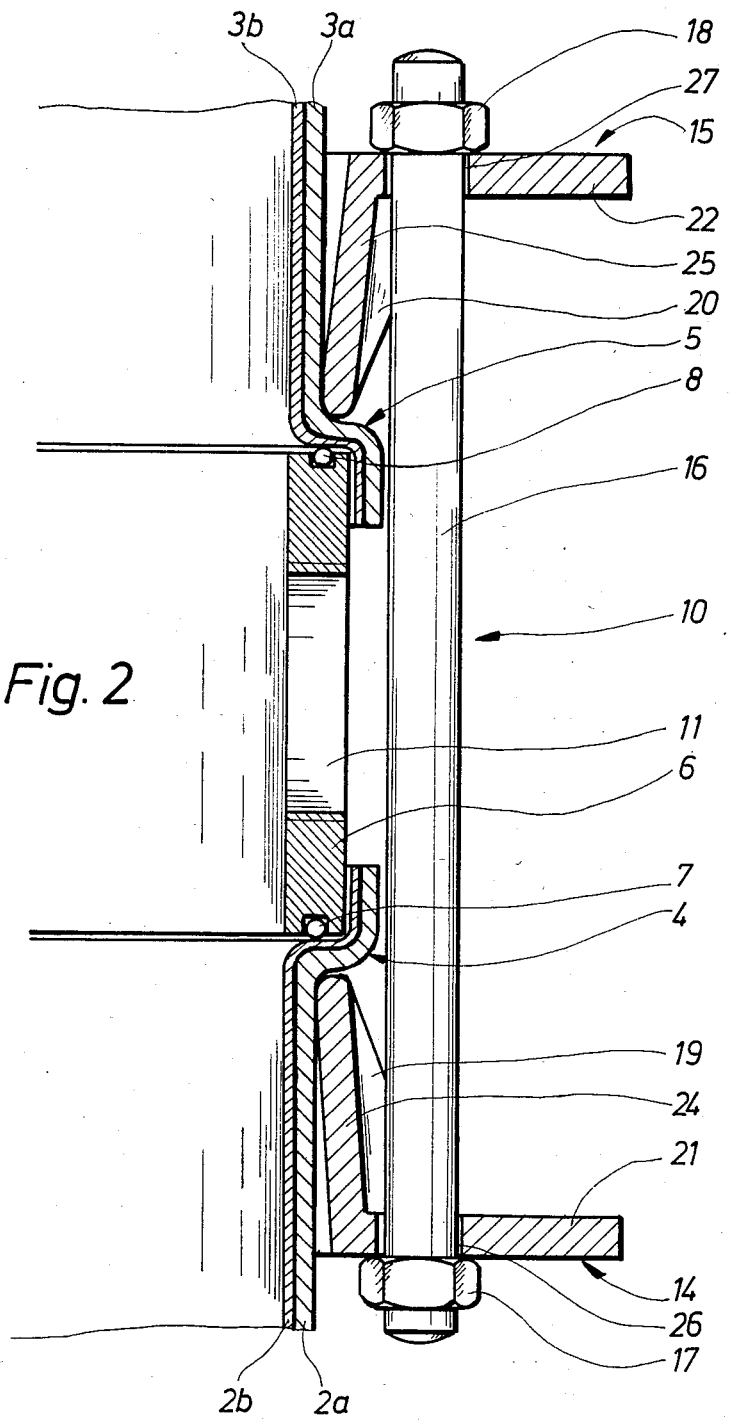
FIG. 2 is a side view on a larger scale of part of a joining of two end portions about an intermediate portion by means of two annular flanges.
Figure 3:
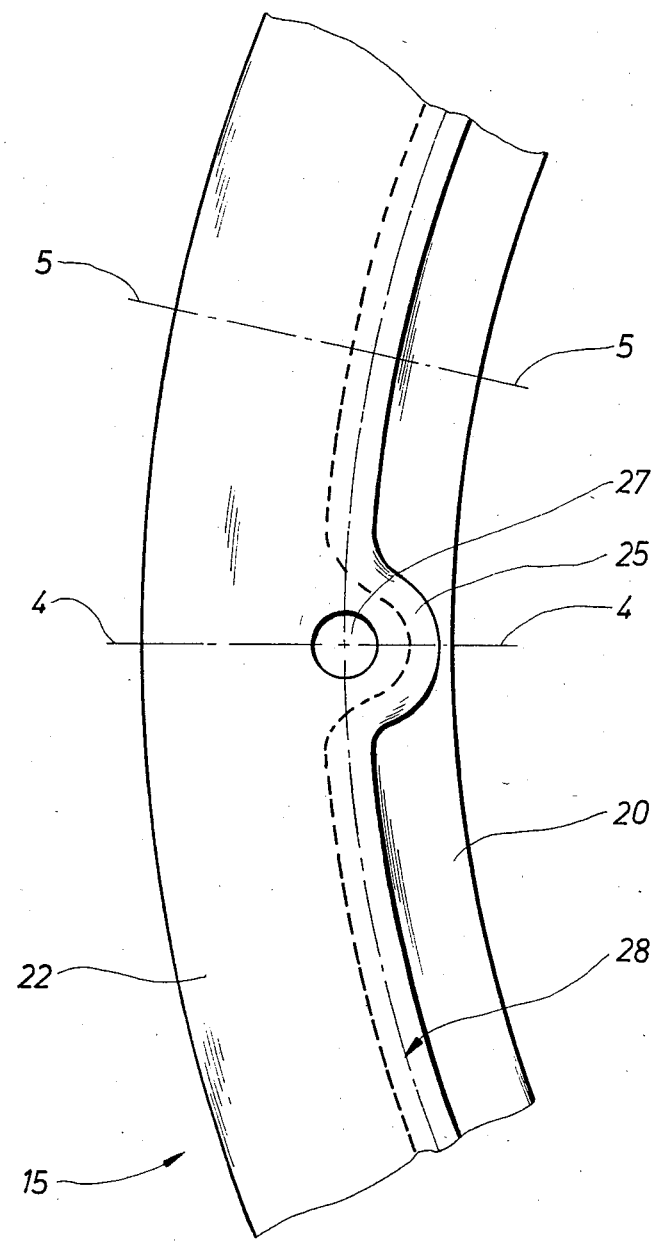
FIG. 3 illustrates part of an annular flange seen from the dished end of the container towards the intermediate portion.

FIG. 2 illustrates part of a container with double-layered end portions 2a, 2b, and 3a, 3b positioned about an intermediate portion 6 with the sealing means 7, 8 by means of the tightening means 10. This tightening means 10 comprises two annular flanges 14, 15 tightened together about the corbelled rim portions 4, 5 of the end portions and the intermediate portion 6 therebetween by means of a thread bar 16 and two nuts 17, 18. The flanges 14 and 15 comprise two webs 19, 20, 21, 22 as clearly illustrated in FIGS. 4 and 5, whereby the inner webs 19, 20 adjacent the container walls form inner cone rings 19, 20, the clear of which at the free rims of the flanges corresponds to the outer diameter of the container immediately adjacent the corbelled rim portions 4, 5. The other webs 21, 22 of the flanges form substantially planar outer rings 21, 22 perpendicular to the axis of symmetry of the container 1. Opposite the thread bar 16 and the nuts 17, 18, the flanges 14, 15 are pressed out into extrusions 24, 25 providing room for the bolt holes 26, 27 in the outer rings 21, 22, as clearly illustrated in FIG. 3, where the circle 28 of the bolts (thread bar 16) clearly appears too.

Figure 4:
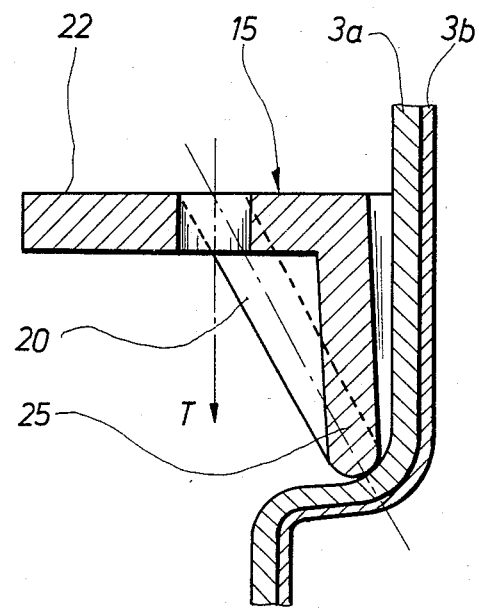
FIGS. 4 and 5 are sectional views taken along the lines 4—4 and 5—5 through the flange of FIG. 3 with the associated container wall with corbelled rim, and FIG. 6 corresponds to the view of FIG. 2 of another tightening means.
Figure 5:
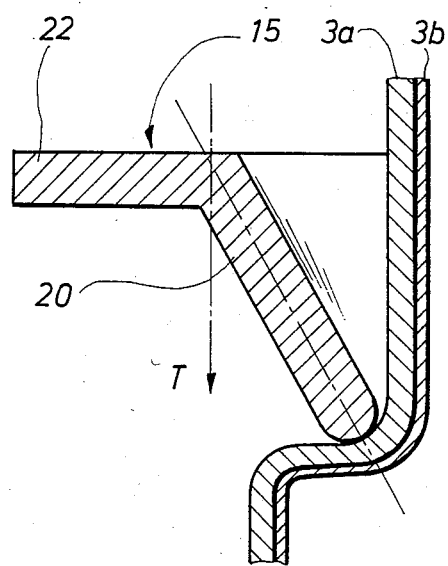

The above flanges 14, 15 and the location of the circle of the bolts imply that the tractive forces T from the bolts are dissolved into compressive forces, cf. FIGS. 4 and 5, which are transferred through the cone ring 20 so as to compress the end portions about the intermediate portion and an outwardly directed component of a force substantially in the plane of the outer ring 22, said forces being received as internal tensions in said ring. Therefore the flanges are substantially free of moments.

Figure 6:
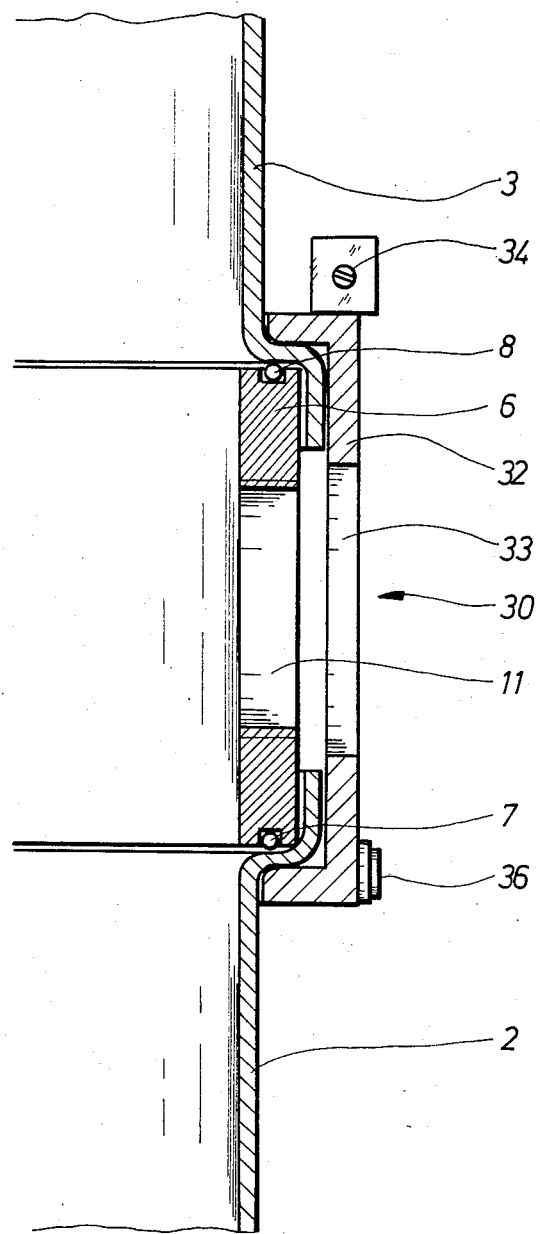

FIG. 6 illustrates another embodiment of a tightening means 30 according to the invention for tightening the two end portions 2, 3 about the intermediate portion 6 with associate sealing means 7, 8. It comprises a tightening ring 32 composed of several parts and with through bores 33 slightly greater than the through bores 11 of the intermediate portion 6. The individual parts of the tightening ring 32 are tightened together by means of tightening screws 34 or tightening bands 36. The location of the tightening ring 32 in its tightening position about the end portions 2, 3 takes place by means of suitable holding implements holding together the parts to be engaged by the tightening ring.

For the sake of convenience the tightening means are in FIGS. 1 and 2 positioned opposite the through bores of the intermediate portion, but in reality they are of course displaced to the side of the through bores 11 whereby access is free to said through bores.

I claim:

1. A container comprising:

two separate cup-shaped end portions with opposing openings;

a separate substantially cylindrical annular intermediate portion compressed between said end portions and having a plurality of peripheral bores therethrough for mounting of external apparatus;

said end portions including facing, outwardly stepped corbelled rims surrounding their openings, and surrounding and centering said intermediate portion; and tightening means to compress the end portions about the intermediate portion so that each of said corbelled rims sealingly engages said intermediate portion;

said tightening means applying force directly to said corbelled rims to urge the corbelled rims inwardly toward the intermediate portion.

* * * * *